(12) United States Patent
Prell et al.

(10) Patent No.: US 6,941,344 B2
(45) Date of Patent: Sep. 6, 2005

(54) METHOD FOR MANAGING THE SIMULTANEOUS UTILIZATION OF DIVERSE REAL-TIME COLLABORATIVE SOFTWARE APPLICATIONS

(76) Inventors: Andrew J. Prell, 7341 St. Andrews Church Rd., Apt. 6, Louisville, KY (US) 40214; Igor N. Livitz, 11706 Hancock Trace Ct., Louisville, KY (US) 40245

( * ) Notice: Subject to any disclaimer, the term of this patent is extended or adjusted under 35 U.S.C. 154(b) by 788 days.

(21) Appl. No.: 09/828,024

(22) Filed: Apr. 6, 2001

(65) Prior Publication Data
US 2002/0010744 A1 Jan. 24, 2002

Related U.S. Application Data
(60) Provisional application No. 60/196,021, filed on Apr. 7, 2000.

(51) Int. Cl.[7] .............................................. G06F 15/16
(52) U.S. Cl. ...................... 709/205; 709/204; 709/203; 709/213; 709/217; 709/218; 709/219; 709/227; 715/753; 715/756; 715/751; 370/261; 370/260; 379/202.01

(58) Field of Search .................................. 709/205, 204, 709/203, 213, 217, 218, 219, 227, 248

(56) References Cited

U.S. PATENT DOCUMENTS

| | | | | |
|---|---|---|---|---|
| 5,293,619 A | * | 3/1994 | Dean ........................... | 707/204 |
| 5,758,079 A | * | 5/1998 | Ludwig et al. ............. | 709/204 |
| 5,862,330 A | * | 1/1999 | Anupam et al. ............ | 709/204 |
| 5,872,971 A | * | 2/1999 | Knapman et al. ........... | 718/101 |
| 6,094,688 A | | 7/2000 | Mellen-Garnett et al. | |
| 6,212,547 B1 | | 4/2001 | Ludwig et al. | |
| 6,233,600 B1 | * | 5/2001 | Salas et al. .................. | 709/201 |
| 6,240,444 B1 | | 5/2001 | Fin et al. | |

\* cited by examiner

*Primary Examiner*—Anthony Knight
*Assistant Examiner*—Thomas Pham
(74) *Attorney, Agent, or Firm*—Stites & Harbison PLLC

(57) ABSTRACT

The present invention describes a system 10 and method for managing the simultaneous utilization of diverse real-time collaborative software applications. This method allows linking of multiple computer operators or users in a single collaborative session, involving multiple collaborative applications transparent to the operator or user.

7 Claims, 3 Drawing Sheets

System Block Diagram

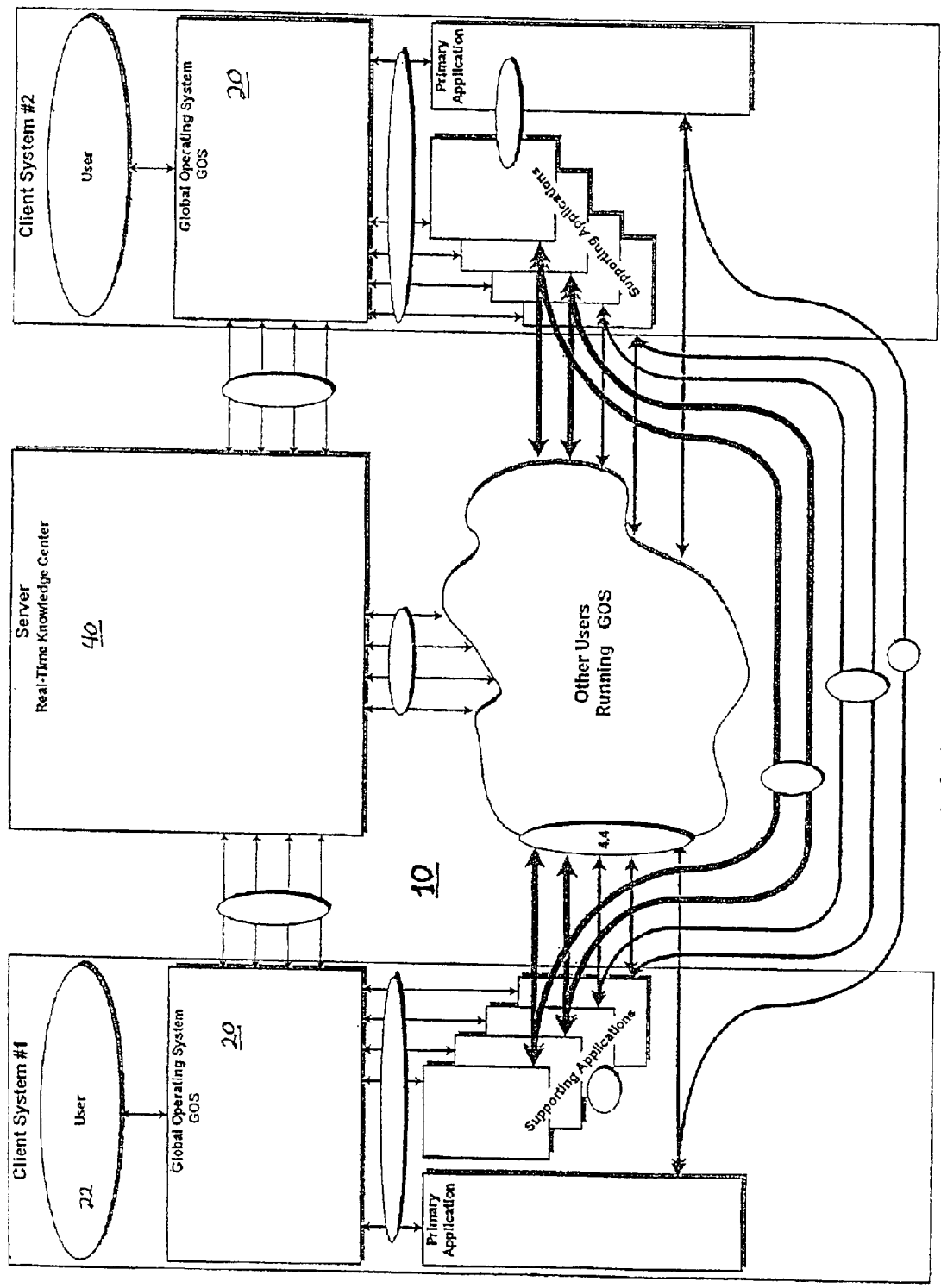
FIG. 1  System Block Diagram

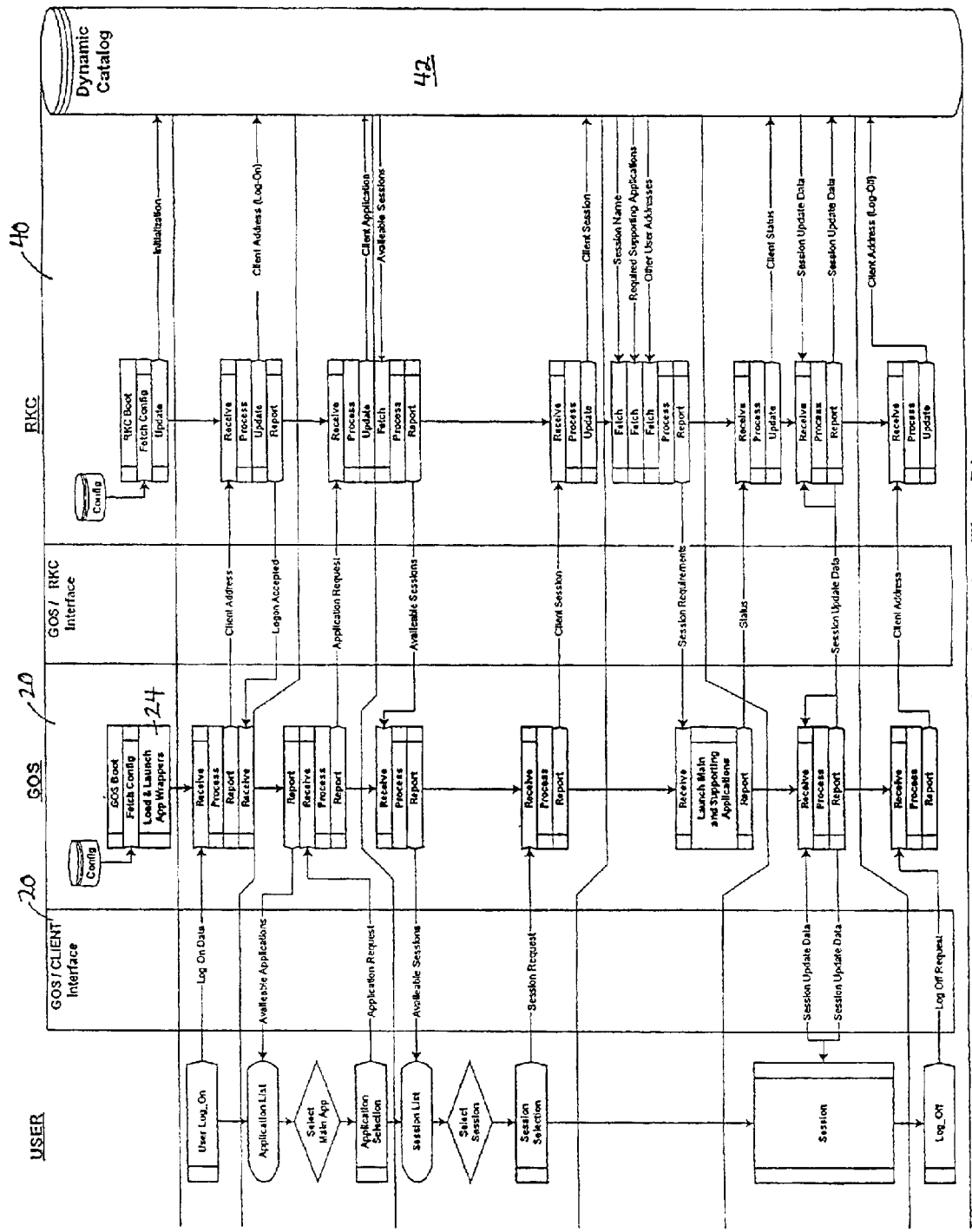
FIG. 2   Session Operation Flow Diagram

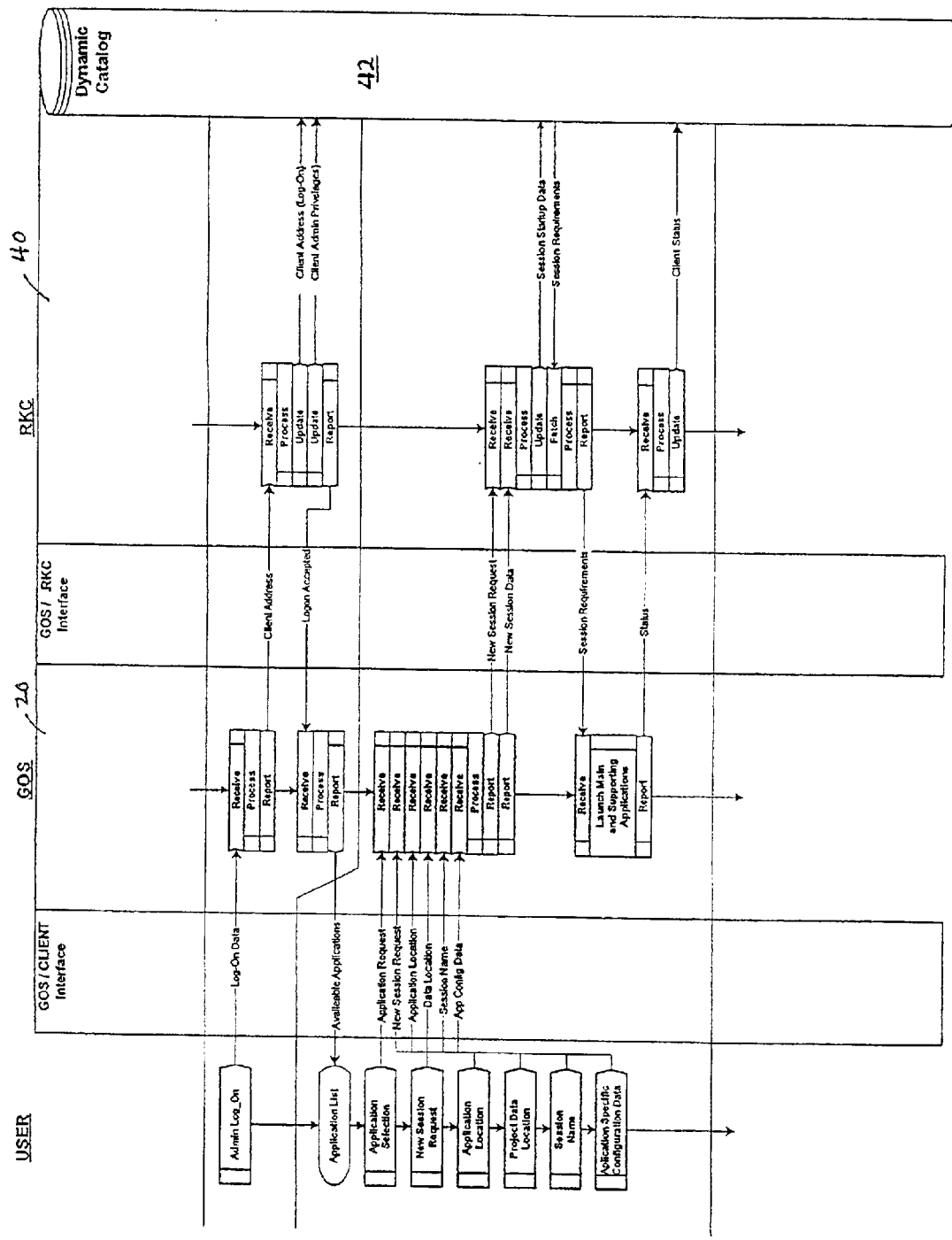
FIG. 3 Session Initialization Flow Diagram

METHOD FOR MANAGING THE SIMULTANEOUS UTILIZATION OF DIVERSE REAL-TIME COLLABORATIVE SOFTWARE APPLICATIONS

This application claims the benefit of U.S. Provisional Application No. 60/196,021, filed Apr. 7, 2000.

BACKGROUND OF THE INVENTION (a) Field of the Invention

The present invention describes a method for managing the simultaneous utilization of diverse real-time collaborative software applications. This invention allows linking of multiple computer operators or users in a single collaborative session, involving multiple collaborative applications, and is transparent to the operator or user.

(b) Description of the Prior Art

The prior art methods used by computer professionals to provide a collaborative computer-based session between remote computer workstations have numerous shortcomings. One approach is to provide a mechanism for exchanging streaming data (video and voice) while concurrently exchanging application data. This is implemented by sharing one instance of an application on one of the participant's computers. For example, this approach was used by the creators of MS™ Net Meeting™. This approach operates by letting a computer operator, running a non-collaborative software application such as MS Word™, share the application with other people in the session. Users then take turns editing or controlling the single application. This approach does not work when the application in use in a session is a truly collaborative one, requiring multiple computer operators to exchange application data in real-time. An example of this type of application is any multi-player game.

Another common approach is to provide a mechanism in an application supporting the exchange of limited data formats. For example, the application may support a real-time text message exchange (chat) and data exchange of some proprietary data format. For example, the application may allow drawing of the same picture by different computer operators simultaneously. Unfortunately, this is all that application will support. It does not provide support for any third party applications employing alternate data formats.

SUMMARY OF THE INVENTION

The present invention relates to a real-time collaborative application which is a multi-computer operator application (computer program) that allows computer operators or users running this program on their computers to exchange application specific data in real-time.

The present invention allows one communication session to handle all communication links between diverse collaborative applications virtually transparently for the computer operator or user. The present invention achieves this without creating a bandwidth bottleneck at one central site.

A collaborative application session maintains some common data and exchanges some data between a particular group of computer operators participating in the session. Usually, collaborative applications are implemented using the client-server model, where a server is a separate computer program that hosts and/or implements one or more application sessions. Each computer operator uses a client program to connect to a particular application session on a server with a known network address and the server manages data sharing and exchange between computer operators participating in the session. Generally, collaborative applications use proprietary data formats and communications protocols. An example of a collaborative application is a multi-player computer game such as Quake III Arena™ or Unreal Tournament™, where computer operators play against each other, requiring that data be exchanged in real-time between computers participating in a particular game session.

However, as networking becomes more prevalent and collaboration becomes more advanced, the need arises for computer operators to use multiple collaborative applications from different vendors concurrently with the same group of computer operators to accomplish the required session tasks. An example of this is the use of one of the above-mentioned games in a session where each participant can also see and talk to each other while playing from remote locations. Each participant sees the others simultaneously through a third party multi-point video technology, such as Lucent's iCosm™ multi-point video system (iCV); and each participant can hear and talk to the others simultaneously through a multi-point audio mixer, such as Lucent's iCV™ IP Audio Bridge. This example adds many more layers of complexity to an already complex task, thus making it unusable or at least very difficult for the average computer operator. We will refer to these complex multi-application collaborative sessions from this point on as 'sessions' or individually as a 'session'.

The instant invention provides each computer operator or user a simple and straightforward way to enter into a complex multi-application real-time collaborative session with others.

The present invention is a system and method for linking multiple computer operators together in a multi-application collaborative session while simultaneously linking their shared project data and shared streaming broadband data needs.

Computer code for collaborative applications can store project data on a centralized server so many computer operators in the same or remote locations can have simultaneous access thereto. These same computer operators may also have a need to talk to and view other remote computer operators working on the project. This can be accomplished using other computer code creating streaming data links between parties, as is well known in the art. Streaming data transports a variety of different media types from location to location, or one location to many other locations. These different types of media include but are not limited to: audio (voice, sounds, music, etc.), video (live video, movies, television broadcast, etc.), and computer generated graphics. This other computer code can be embedded in the same application or several different applications running simultaneously.

Current implementation processes are somewhat complex when linking just two computer operators into a collaborative session and allowing them to work on the same project data while they can talk to each other and see live video of each other. This process becomes significantly more complex when three or more computer operators are interacting in the same session that requires the use of two or more applications by different manufacturers. The process is an order of magnitude more complex when designed to handle millions of computer operators seeking to collaborate in many grouped sessions with specific other computer operators via video, voice, and data, using many different, collaborative computer applications. The present invention accomplishes this collaboration while making it simple for the average person to use.

The instant invention comprises a "computer interface" and a "centralized real-time catalog". The "computer interface" is front-end client software and, in the preferred embodiment, is referred to as "GOS" for global operating system. The "centralized real-time catalog" is back-end software and, in the preferred embodiment, is referred to as "RTKC" for real-time knowledge center. Also, the terms "catalog" and "index" are used interchangeably herein.

Each computer operator needs to have a computer interface that communicates via a data network with the centralized real-time catalog. The computer interface is configured to catalog or index the applications that reside on the computer or the interface can poll the computer's operating system to determine which applications are currently on the computer that the interface has been installed on. The interface can also poll the centralized real-time catalog to find other applications it may either download or run remotely.

When a computer operator creates a new collaborative session, the interface reports to the centralized real-time index that session's network address, all required session parameters, and the server network address where that session's project data is stored. If any security data such as passwords are required, they can either be predefined or defined when the session is started.

Any computer operator wishing to join the session must first have the ability to run the required applications in accordance with that session's requirements. Once this is determined by the joining computer operator's interface, that interface sends its network address to and retrieves the session joining instructions from the Centralized Real-time Index. All security details and joining requests are then verified, and the computer operator's interface receives the network addresses of all related computers and computer servers for that session. The joining computer interface then launches all relating computer application code required for that session and passes the required network addresses to those applications to link to the corresponding applications on the other computers. At the same time the other computer interfaces in the session are informed that the joining computer has joined and they also provide that entrant's network address to the appropriate applications in order to recognize and interact with the new entering computer interface's applications.

BRIEF DESCRIPTION OF THE DRAWINGS

A better understanding of the present invention will be had upon reference to the following description in conjunction with the accompanying drawings, wherein:

FIG. 1 is a block diagram of the system in accordance with the instant invention;

FIG. 2 is a session operation flow diagram in accordance with the instant invention; and, FIG. 3 is a session initialization flow diagram in accordance with the instant invention.

DETAILED DESCRIPTION OF THE PREFERRED EMBODIMENT

Referring to the drawing figures, the instant invention is a system 10 and method for managing the simultaneous real-time operation of a plurality of software applications comprising a global operating system 20 and a real-time knowledge center 40. In a preferred constructed embodiment of the instant invention, the global operating system 20 is comprised of a computer readable medium having computer executable instructions resident in a plurality of client (front-end) computers. The real-time knowledge center 40 is preferably server based (back-end) and is comprised of a computer readable medium having computer executable instructions, and a centralized real-time catalog of session data.

On the back-end, the required results are achieved by creating a server process that tracks application sessions, applications used by computer operators, computer operators participating in applications sessions, etc. The real-time knowledge center 40 serves as a real-time catalog 42 or index of all systems events. Since collaborative applications written by various vendors are not developed to provide this information to the real-time knowledge center 40, those third party applications must be forced to operate in accordance with system requirements. The global operating system 20 of the instant invention provides a client-based system for managing said third party applications, as described hereinbelow.

When the global operating system client starts, depending on the particular client system configuration, it automatically starts from 0 to n (some number) processes (application servers) on a background that hosts some applications sessions. The global operating system client then reports all process parameters to the real-time knowledge center 40 server, which updates its catalog or index 42, registering the client's network address and the applications sessions it hosts.

When a computer operator logs in to a client computer using the global operating system client interface 22, the global operating system 20 reports this event to the real-time knowledge center 40 server, which then updates its catalog or index 42 with respect to the current computer operator at that computer's network address. When that computer operator wants to use a particular collaborative application, the global operating system client requests from the real-time knowledge center 40 server a list of available sessions for a given application. When that computer operator selects a particular session to participate in, the global operating system 20 starts the applications required for that session and passes to them the parameters retrieved from the real-time knowledge center 40 so they will connect to that particular session. The information that a given computer operator has joined the session is also registered in the real-time knowledge center server catalog 42.

When the computer operator selects a collaborative session to join, in addition to other session parameters such as session name and the applications to launch, the global operating system 20 also receives from the real-time knowledge center 40 information in the form of data about the computer operators already participating in the session. This data includes all network addresses of session computer operators' computers. When the computer operator joins the session, the global operating system 20 client software points all the relating applications toward the aforementioned network addresses.

For example, with three session members (players) already in a Quake III™ session and a fourth entering, the global operating system 20 on the fourth computer would launch Quake III™ and point it directly to a designated QUAKE III™ server, would launch three iCOSM™ video windows and point them individually to each of the three other session members' computers, and would point the iCV audio towards a designated iCV Audio Bridge Server. Simultaneously, the real-time knowledge center server notifies the other session members that a new computer operator has joined the session. This event causes the global operating system 20 on every session member's computer to create a new iCOSM™ video window and point it to the new session member's computer. In this example, the iCV Audio Bridge automatically permits the addition of the new session member's voice to the session so nothing has to be done to conform the voice application on the new session member's computer. Consequently, all computer operators participating in a given session can see and talk to each other while simultaneously collaborating in the game application.

Alternatively, the system can be configured in such a way, that if a new computer operator is of particular type (a system operator for example), that computer operator receives video/audio input from all members of the session, but none of the normal session members can see or hear that special computer operator. This embodiment of the instant invention can be used for system monitoring purposes. Also, the system can be configured to allow any computer operator or only specified computer operators, such as system administrators, to create and launch new sessions of any conforming applications.

The system and method described herein is a completely distributed system having no single data bottleneck. Application sessions are hosted on different network nodes (computers). Streaming data such as real-time voice and video streams are exchanged directly between every two client computers participating in the same session. Furthermore, the real-time knowledge center 40 exchanges only catalog or index data. The real-time knowledge center does not exchange either application specific or streaming data, so its bandwidth requirements are very low. Additionally, catalog data can be distributed on several real-time knowledge center servers, thereby further reducing the threat of any centralized data bottleneck. For example, one server can maintain catalog data related to entertainment application sessions, another related to health care applications sessions, and yet another to business applications sessions. Furthermore, catalog data can be replicated among several servers to achieve a higher level of reliability and load balancing.

The nature and variety of collaborative applications requires the global operating system 20 to force those different applications to behave uniformly. To overcome this problem, the global operating system further comprises an application wrapper 24 that is analogous to a hardware driver, but applied to a software application instead.

To illustrate the operation of an application wrapper 24, the means by which most operating system handle printing may be described. Obviously, many different printers exist. If operating systems, for example MS Windows™ or Sun Unix™, had to be updated every time a new printer was introduced, it would cause problems as described above. Instead, a printer driver comprising a separate software module that has a known specific interface for an operating system is employed to implement printing functionality for a particular printer (type). The printer hardware configuration specifics are hidden from the operating system in a printer driver. The operating system only "sees" that the printer driver supports a standard printing interface. Consequently, the operating system does not need to be changed when a new printer is introduced. Instead, a separate software module, called a printer driver, is created either by the operating system vendor or, more often, by a printer manufacturer.

Similarly, the application wrapper 24 in the global operating system 20 has known interfaces used by the global operating system 20. The application wrapper 24 hides peculiarities of interfacing and controlling a given application from the global operating system 20. Therefore, when a new application is used within the global operating system 20, it does not require changes in the global operating system 20 client software. Instead, a novel software module, the 'application wrapper' 24 is produced. It is comprised of a first part that provides an application specific computer operator interface, a second part that controls a corresponding collaborative application, and a keyboard filter, as described further below.

The complete process of joining a collaborative session is described in the following steps as detailed in FIG. 2. 1) The Computer operator (user) selects a main application from applications available on a given global operating system computer. 2) The global operating system retrieves available sessions for the given application. 3) The computer operator decides on the session to join. 4) The global operating system 20 loads a corresponding application wrapper and requests that wrapper to start the main application required for that collaborative session and connect the application to a particular session server and session project data. 5) The global operating system 20 launches the corresponding required minor applications in the correct order. This accomplishes tasks like establishing data communications channels for both video and voice streaming input from all members of a given session. 6) Once notified by the real-time knowledge center 40, all other session group members' computers also launch the corresponding applications to establish corresponding channels to transmit and receive streaming data to and from a new computer operator.

When a computer operator decides to quit a session, an opposite process occurs. The global operating system 20 client software requests the application wrapper corresponding to the main application to shutdown the main application, then it shuts down all corresponding minor applications. Next, the global operating system client informs the real-time knowledge center server that it is disconnecting from the session. The real-time knowledge center server then updates its catalog (index) and then notifies all other session member computers that the given member computer has quit the session. After receiving that notification, the global operating system 20 installed on all of the remaining session member computers shuts down all corresponding application windows related to the leaving member's computer.

In order to allow the global operating system 20 to control applications through a corresponding application wrapper 24, the global operating system client software intercepts and acts on computer operator actions before a current application receives corresponding action notifications. For example, it was determined that it would be convenient to shutdown all applications, regardless of their nature when the escape key is pressed. However, different applications behave differently when the escape key is pressed. Some exit immediately, while others prompt computer operators prior to termination, and others simply ignore this action. The global operating system 20 controls application responses to keep the real-time knowledge center catalog synchronized.

To achieve this, the global operating system client software may further comprise a keyboard driver/filter. The filter intercepts keyboard press events and allows the global operating system client software to decide what action or actions should follow, prior to the application receiving it. For example, when the escape key is pressed, the global operating system client deactivates (pauses) the current collaborative application and asks the computer operator whether he or she wants to quit a given session. If the computer operator confirms his decision, the global operating system 20 executes all steps described above to disconnect the global operating system computer from the session.

The instant invention employs a server process that maintains a real-time catalog 42 (index) of a collaborative system and client side computer readable medium having computer executable instructions that communicates with server side computer readable medium, providing the computer operator with an interface that manages complex multi-application collaborative sessions and third party applications through application wrappers.

Referring to FIGS. 1 and 2, the global operating system 20 client software is installed locally on a plurality of client computers, providing a system and method to enter into a complex multi-application real-time collaborative session with other users. The instant invention provides a "public friendly" interface to the user and launches and manages all applications required for a particular session. The same primary application and the same set of supporting applications are launched by the global operating system 20 for each user in a session.

The instant invention can be implemented in conjunction with a plurality of primary applications, for example, Auto-Cad™, Quake™, Excel™, etc. Furthermore, the instant invention can be implemented by client computer systems running a plurality of supporting applications, for example, video, voice, data, MS Word™, Excel™, etc.

The real-time knowledge center 40 server software is resident on a server platform, or a plurality thereof, and maintains a real-time catalog or index of events in the whole system, maintains session member (user) listings and client network addresses, maintains project data location addresses, maintains primary application support requirements, and maintains all application location addresses.

The real-time knowledge center 40 supplies all connection and configuration data required for a particular collaborative session to the client's global operating system 20, for example network addresses, session listings, configuration data, etc. The real-time knowledge center 40 and global operating system 20 continue to exchange session update data throughout a session to support users joining and leaving a session. Since this is change and configuration data only, bandwidth requirements are very low.

A plurality of medium to high bandwidth real-time primary application data channels are provided to exchange real-time data directly between applications. Furthermore, a plurality of high bandwidth streaming application data channels exchange are provided to exchange real-time video images and real-time audio directly between applications.

In one embodiment of the instant invention, a plurality of medium to high bandwidth real-time supporting application data channels are provided to exchange real-time data directly between applications. Any number of client computers may connect to a particular application session.

Referring to FIG. 2, a session operational flow diagram is provided with the operational steps labeled one through eight. The global operating system starts up on local users systems and the global operating system 20 reads a configuration file from local disk. The global operating system 20 then loads and launches a plurality of application wrappers 24 for configured applications.

The real-time knowledge center 40 starts up on a server, reads a configuration file from a local disk, and initializes the dynamic catalog or index.

A user may then enter log-on data to the global operating system 20. The global operating system 20 then sends client address to the real-time knowledge center 40, which adds the client address to a list of active users in the dynamic catalog 42. The real-time knowledge center 40 then sends a log-on accepted message to the global operating system 20.

In the primary application selection sequence the global operating system 20 presents a primary application list to the user, who selects an application. The global operating system 20 then sends a primary application request to the real-time knowledge center 40.

In the session selection sequence the real-time knowledge center 40 sends an available session list to the global operating system 20. The global operating system 20 presents the available session list to the user. When the user selects a session, the global operating system 20 sends a session join request to the real-time knowledge center 40, which adds the client to the session in the dynamic catalog 42 and the real-time knowledge center 40 sends the client address to other users in session.

In the session launch sequence, the real-time knowledge center 40 fetches the session name from the catalog, fetches supporting application requirements from the catalog, fetches other user addresses from the catalog, and then sends session requirements to the global operating system 20. The global operating system 20 then launches all required applications.

In the session maintenance sequence, the real-time knowledge center 40 sends a new user addresses to the global operating system 20 as users join the session. The real-time knowledge center 40 then notifies the global operating system 20 when users leave the session.

In the user log-off sequence, a user requests to log-off, then the global operating system 20 notifies the real-time knowledge center 40 that client has left session. The real-time knowledge center 40 then removes client from the session list in the catalog 42 and notifies other users in the session that the client has left.

FIG. 3 depicts an administrator setting up a session. However, a user or users may also be permitted to set up a session. All events prior to the log-on sequence are described in the above discussion of FIG. 2. In the administrator log-on sequence, an administrator enters log-on data to the global operating system 20. The global operating system 20 sends client address to the real-time knowledge center 40, which then adds the client address to active users in the dynamic catalog 42. The real-time knowledge center 40 enables administration privileges for the client and sends a log-on accepted message to the global operating system 20.

In the primary application selection sequence, the global operating system 20 presents a primary application list to a user. The administrator selects a new session startup, identifies the location of the primary application for the new session for the global operating system 20, locates the project data for the new session for the global operating system 20, and names the new session. The global operating system then sends session start request and session data to the real-time knowledge center 40. The real-time knowledge center 40 then starts up a new session in the dynamic catalog 42, and reports session requirements to the global operating system 20. The global operating system 20 then launches main and supporting applications.

In addition to normal termination of a session by the various users, a session can also be turned off in other ways. The administrator may shut the session down or set a predetermined time to shut down the session. For example, the session could be set to end on a selected date at 5 p.m., or, the session could terminate based on user inactivity over a period of time. Other triggering events could be used to terminate a session.

The following description is an example of application wrapper 24 implementation. In this instance, application wrappers are implemented as ActiveX automation objects in a form of dynamically linked libraries (DLL). All code samples are in C++ with a use of ATL (Active Template Library), but any other programming language capable of producing ActiveX automation objects can be used.

Every application wrapper in this example supports at least IAppCore interface. This interface has methods implementing core (basic) tasks, such as starting an application session, starting an application in a single user mode (stand alone), starting an application in multi-user mode (connecting to a given session), exiting application, and so forth.

The global operating system 20 can query an application wrapper 24 to check if it supports additional interfaces using standard OLE (ActiveX) method—QueryInterface( ).

The following is a definition of IAppCore interface in IDL (Interface Definition Language):

```
interface IAppCore : IDispatch
{
    [id(1), helpstring("method SetPropertyApp")]
        HRESULT SetPropertyApp([in] long propertyID, [in] BSTR
        propertyValue);
    [id(2), helpstring("method GetPropertyApp")]
        HRESULT GetPropertyApp([in] long propertyID, [out] BSTR
        * propertyValue);
    [id(3), helpstring("method StartGDS")]
        HRESULT StartGDS( );
    [id(4), helpstring("method StartMultipleApp")]
        HRESULT StartMultipleApp( [in] BSTR networkAddress);
    [id(5), helpstring("method StartSingleApp")]
        HRESULT StartSingleApp( );
    [id(6), helpstring("method ActivateApp")]
        HRESULT ActivateApp( );
    [id(7), helpstring("method DeactivateApp")]
        HRESULT DeactivateApp( );
    [id(8), helpstring("method CloseApp")]
        HRESULT CloseApp( );
    [id(9), helpstring("method SetGUIPtr")]
        HRESULT SetGUIPtr(IUnknown * pGui);
    [id(10),helpstring("method StopGDS")]
        HRESULT StopGDS( );
    [id(11), helpstring("method GetKeyBlockMap")]
        HRESULT GetKeyBlockMap([in] VARTANT* varKeys);
};
```

The example below is an exemplary application wrapper implementation for a Quake III ™ program.

The global operating system 20 passes application parameters it gets from a configuration file or/and from user interface module to an application wrapper 24 without any understanding of the nature of those parameters. To the global operating system 20, this is simply a (property id, property value) pair. The interpretation of these parameters are accomplished by the application wrapper 24 and, ultimately, by the application itself.

```
STDMETHODIMP CAppCore: SetPropertyApp (long propID, BSTR propValue)
{
    AFX_MANAGE_STATE (AfxGetStaticModuleState( ))
    CString strValue = propValue;
    if (CAgoraAppBase::SetPropertyApp(propID, strValue))
    {
        return S_OK;
    }
    switch (propID)
    {
    case PROP_QUAKE_APP_PATH_ID:
        m_AppPath = strValue;
        break;
    case PROP_QUAKE_APP_NAME_ID:
        m_AppName = strValue;
        break;
    case PROP_QUAKE_SAVE_LEVELS_PATH_ID:
        m_SaveLevelsPath = strValue;
        break;
    case PROP_QUAKE_START_PARAM_ID:
        m_StartParam = strValue;
        break;
    case PROP_QUAKE_SINGLE_LEVEL_PARAM ID:
        m_SingleLevelParam = strValue;
        break;
    case PROP_QUAKE_SKIN_PRIMARY_PARAM_ID:
        m_SkinParamPrimary = strValue;
        break;
    case PROP_QUAKE_WAIT_FIND_WND_ID:
        m_SecWaitFindWnd = atoi((const char
*) (LPCTSTR) strValue);
        break;
    case PROP_QUAKE_CONFIG_FILE_PATH:
        m_ConfigFilePath = strValue;
        break;
    case PROP_QUAKE_GDS_START_PARAM_ID:
        m_GDSStartParam = strValue;
        break;
```

-continued

```
        default:
            return(S_FALSE);
        }
        return S_OK;
}
        The method below starts a background process (Quake
III ™ Server) which is responsible for implementing a Quake
III ™ game session. Note that some session parameters are
based on information passed by the SetPropertyApp( ) method.
STDMETHODIMP CAppCore::StartGDS ( )
{
    AFX_MANAGE_STATE (AfxGetStaticModuleState( ))
    // Set current work directory (if exist) for given app
    if (!m_AppPath.IsEmpty( ))
        SetCurrentDirectory (m_AppPath);
///////////////////////////////////////////////////////////////////////////
    // Start Quake3
    STARTUPINFO startupInfo;
    memset(&startupInfo, 0, sizeof(STARTUPINFO));
    startupInfo.dwFlags |= STARTF_USESHOWWINDOW;
    startupInfo.wShowWindow = SW_HIDE;
    startupInfo.cb = sizeof(STARTUPINFO);
    BOOL res = FALSE;
    try
    {
        res = CreateProcess(m_AppName, (LPTSTR) (LPCTSTR) (" "
+
                        m_GDSStartParam + " " + m_StartParam
                        + " " + GDS_CONFIG_FILENAME), NULL,
                        NULL, FALSE, 0, NULL, NULL,
                        &startupInfo, &m_ProcessInfo);
    }
    catch( . . . )
    {
        return S_FALSE;
    }
    if (!res)
        return S_FALSE;
    return S_OK;
}
        The exemplary method shown below starts the Quake III ™
application and connects it to a particular game session
based on a given network address. Note that in this
particular situation, the network address is just an IP
(TCP/IP) number representing the computer where a
corresponding Quake III ™ server resides. In alternative
embodiments, the network address can be an IP number and an
IP port number, or any other data needed to establish
connection with a particular session.
STDMETHODIMP CAppCore::StartMultipleApp (BSTR networkAddress)
{
    AFX_MANAGE_STATE (AfxGetStaticModuleState( ))
    // Set current work directory (if exist) for given app
    if (!m_AppPath.IsEmpty( ))
        SetCurrentDirectory(m_AppPath);
    // Delete all from Save directory
    if (!m_SaveLevelsPath.IsEmpty( ))
        EmptyDirectory(m_SaveLevelsPath);
    // Create cfg file
    CString fName = m_ConfigFilePath + "\\" +
MULTIPLE_CONFIG_FILENAME;
    CString cfgStr;
    try
    {
        CStdioFile cfgFile(fName, CFile::modeCreate |
CFile::modeWrite);
        // Set connection string
        CString strStationIP = networkAddress;
        if (!strStationIP.IsEmpty( ))
        {
            cfgStr.Format ((LPCTSTR) "connect %s\n",
strStationIP);
            cfgFile.WriteString (cfgStr);
        }
        cfgFile.Close( );
    }
    catch( . . . )
    {
        return S_FALSE;
```

-continued

```
        }
////////////////////////////////////////////////////////////////
        // Start Quake3
        STARTUPINFO startupInfo;
        memset (&startupInfo, 0, sizeof (STARTUPINFO));
        startupInfo.dwFlags | = STARTF_USESHOWWINDOW;
        startupInfo.wShowWindow = SW_HIDE;
        startupInfo.cb = sizeof(STARTUPINFO);
        BOOL res = FALSE;
        CString csStartParameter = " ";
        // Set user name
        if (!m_UserName.IsEmpty( ))
        {
            csStartParameter.Format((LPCTSTR)" +set name %c%s%c",
                DOUBLE_QUOTE_CHR, m_UserName, DOUBLE_QUOTE_CHR);
        }
        // Set skin
        if (!m_SkinParamPrimary.IsEmpty( ))
        {
            csStartParameter += CString("+set model ") +
                                CString(DOUBLE_QUOTE_CHR) +
                                m_SkinParamPrimary +
                                CString(DOUBLE_QUOTE_CHR);
}
csStartParameter += " " + m_StartParam + " " +
MULTIPLE_CONFIG_FILENAME;
    try
    {
        res = CreateProcess(m_AppName,
(LPTSTR) (LPCTSTR) (csStartParameter),
                        NULL, NULL, FALSE, 0, NULL, NULL,
                        &startupInfo, &m_ProcessInfo);
    }
    catch( . . . )
    {
        return S_FALSE;
    }
    if (!res)
        return S_FALSE;
    CWnd* pMainWnd = FindAppMainWnd(m_ClassName,
m_SecWaitFindWnd);
    if (pMainWnd == NULL)
        return S_FALSE;
    // Change window style
    long style = GetWindowLong (pMainWnd->GetSafeHwnd( ),
    GWL_STYLE);
    style ^= WS_CAPTION;
    SetWindowLong(pMainWnd->GetSafeHwnd( ), GWL_STYLE, style);
    // Change window positon
    pMainWnd->SetWindowPos (&CWnd::wndTopMost, 160, 120, 640,
480,    0);
    pMainWnd->ShowWindow(SW_SHOW | SW_RESTORE);
    // If we did not pass a callback interface (did not call
            AtlAdvise( ))
    // it does not make sense even start a thread
    IUnknown **ppUnk = mu_vec.begin( );
    if (*ppUnk != NULL)
    {
        _IAppCoreEvents * pCallback = (_IAppCoreEvents *)
*ppUnk;
        StartCheckAppThread(m_ClassName, pCallback);
    }
    return S_OK;
}
```

Each application wrapper also accepts a callback interface provided by the global operating system, which serves as a notification mechanism to pass information back from the application wrapper to the global operating system. An exemplary callback interface supporting one method is shown below:

```
interface _IAppCoreEvents : IDispatch
{
        [id(1), helpstring("method OnAppClosed( )")] HRESULT
            OnAppClosed( );
};
```

This event serves as a notification in the event the application stops running without a global operating system request, for example, in an application crash.

The instant invention may also be employed as a method of using remote live experts on the the global operating system/real-time knowledge center system. These experts, alone or in teams, interact with the computer operators over the computer network via voice, video and data to help the computer operators with the many complexities of the individual applications residing in the global operating system or any other needs that may arise. On the global operating system/real-time knowledge center system, these experts may act as, but are not limited to: a routing operator to other experts, a guide, a tournament host, a friend, a professional advisor (for example a doctor, a lawyer, a stock broker, a teacher), a teammate, an opponent, a referee, a help desk, a complaint desk, a customer service representative, a retail sales representative, and a new product marketer.

Even though several of these types of experts exist today on the world-wide web, they have never before interacted over any network in a highly collaborative multi-participant, voice, video and data format. Consumers will benefit by being able to interact over the global operating system/real-time knowledge center system in an audiovisual format with factory direct experts when making purchasing decisions or solving problems with purchased merchandise.

The foregoing detailed description is given primarily for clearness of understanding and no unnecessary limitations are to be understood therefrom for modifications can be made by those skilled in the art upon reading this disclosure and may be made without departing from the spirit of the invention and scope of the appended claims.

We claim:

1. A system for managing the simultaneous real-time operation of a plurality of software applications among a plurality of users comprising:
   (a) a plurality of client computer systems connected in a communications network having at least one central server, said client computer systems further connected by a plurality of application data channels for the transmission of data directly between said client computer systems;
   (b) a global operating system resident in each client computer system comprising a computer readable medium having computer executable instructions, said global operating system having a user interface and a plurality of application wrappers, said plurality of application wrappers providing an interface between said global operating system amid each of said plurality of software applications, said application wrappers further providing computer executable instructions that intercept and interpret keystrokes from a user prior to their interpretation by said plurality of software applications;
   (c) at least one collaborative session created by a one of said client computers systems, said collaborative session having a plurality of data parameters;
   (d) a real-time knowledge center resident on said at least one central server for tracking the plurality of collaborative session data parameters;
   (e) a centralized real-time data index for storing the plurality of collaborative session data parameters; and
   (f) means for passing said collaborative session data parameters between said real-time knowledge center and said global operating system resident.

2. A system as claimed in claim 1 wherein said collaborative session data parameters include at least one network address for each of said computer systems, each of said software applications, and each of said collaborative session data parameters.

3. A system as claimed in claim 1 wherein said collaborative session data parameters include a security password required for entry into said collaborative session.

4. A system as claimed in claim 1 wherein said centralized real-time data index further includes a list of applications required for said collaborative session.

5. A system as claimed in claim 4 wherein said real-time knowledge center downloads or runs remotely any required application to said client computer systems.

6. In a system for managing the simultaneous real-time operation of a plurality of software applications running on a plurality of client computer systems connected in a network having at least one central server, a computer readable medium having computer executable instructions comprising:
   (a) a global operating system resident in each of said plurality of client computers, said operating system having a user interface and a plurality of application wrappers, said application wrappers providing an interface between said global operating system and each of said plurality of software applications, said application wrappers further comprising: a keyboard filter that intercepts keyboard inputs to said client computer systems and interprets said keyboard inputs in accordance with the application wrappers for said collaborative session;
   (b) at least one collaborative session created by a one of said client computer systems, said collaborative session having a plurality of data parameters; and
   (c) a real-time knowledge center resident on said at least one central server for tracking a plurality of collaborative session data parameters, said real-time knowledge center comprising:
      (i) a centralized real-time data index for storing said plurality of collaborative session data parameters; and
      (ii) means for passing said collaborative session data parameters between said real-time knowledge center and said global operating system resident in each of said client computer systems.

7. A method for managing the simultaneous real-time operation of a plurality of software applications running on a plurality of client computer systems among a plurality of users as claimed in claim 6 further comprising the steps of:
   (a) storing a list of all software applications required for each of said at least one collaborative sessions in said centralized real-time data index;
   (b) providing said list of all software applications to each of said global operating systems; and
   (a) loading a corresponding one of said application wrappers corresponding to said list of software applications;
   (d) executing the software applications in said list through an interface defined by said corresponding application wrappers.

* * * * *

UNITED STATES PATENT AND TRADEMARK OFFICE
CERTIFICATE OF CORRECTION

PATENT NO. : 6,941,344 B2
DATED : September 6, 2005
INVENTOR(S) : Prell et al.

Page 1 of 1

It is certified that error appears in the above-identified patent and that said Letters Patent is hereby corrected as shown below:

Column 15,
Line 49, change "amid" to -- and --.

Signed and Sealed this

Seventh Day of February, 2006

JON W. DUDAS
*Director of the United States Patent and Trademark Office*